April 17, 1934.   R. N. FALGE ET AL   1,954,806
AUTOMOBILE HEADLIGHTING SYSTEM
Original Filed May 23, 1931   5 Sheets-Sheet 1

Inventors
Charles E. Godley &
Robert N. Falge
By Blackmore, Spencer & Flint
Attorneys April 17, 1934.                R. N. FALGE ET AL                1,954,806
                        AUTOMOBILE HEADLIGHTING SYSTEM
                    Original Filed May 23, 1931    5 Sheets-Sheet 4

Inventors
Charles E. Godley &
Robert N. Falge
By Blackmore, Spencer & Flint
Attorney April 17, 1934.   R. N. FALGE ET AL   1,954,806
AUTOMOBILE HEADLIGHTING SYSTEM
Original Filed May 23, 1931   5 Sheets-Sheet 5

Inventors
Charles E. Godley &
Robert N. Falge
By Blackmon, Spencer & Flint
Attorneys Patented Apr. 17, 1934

1,954,806

UNITED STATES PATENT OFFICE 1,954,806

AUTOMOBILE HEADLIGHTING SYSTEM

Robert N. Falge, Anderson, Ind., and Charles E. Godley, Ypsilanti, Mich., assignors, by mesne assignments, to General Motors Corporation, Detroit, Mich., a corporation of Delaware Original application May 23, 1931, Serial No. 539,518. Divided and this application April 3, 1933, Serial No. 664,193

12 Claims. (Cl. 240—41.25)

This is a division of our prior application Serial No. 539,518, filed May 23, 1931.

Present day automobile headlighting systems consisting of a reflector, lens and two filament bulb usually arranged with one filament at the focus of the reflector and one filament above the focus, provide two beams, a high beam for distant lighting and a low beam for city driving and for passing approaching vehicles. While this system is a great advance over prior single beam systems, it is unsatisfactory in a number of respects and undoubtedly its defects are responsible for some of the accidents and much of the inconvenience that attend night driving at the higher speeds now customary. A few of these defects will be pointed out.

The dual-beam system is based on the premise that approaching drivers will depress their beams in passing so that no high intensity upwardly directed rays will strike the eyes of either driver. To encourage the driver to use the proper beam at the right time it is advisable to so arrange the system that the proper beam provides maximum safety and comfort in meeting the condition for which it is intended. The lower beam now provided is deficient in that it is depressed over its entire width and to such an extent that it reaches only a short distance ahead such that it is hardly safe for car speeds over 20 miles per hour. If the driver of the car is traveling at the rate of 50 or 60 miles per hour, using his upper beam, it is not fair to expect him to depress his beam for the benefit of the approaching driver and risk collision with obstacles or pedestrians not reached by his lower beam.

Practically every car built today is capable of attaining a speed of 60 miles per hour, and many of them are regularly driven at night at speeds in excess of fifty miles per hour. The present upper beam, aimed with its maximum intensity horizontal, provides sufficient illumination when traveling at such a rate of speed along a level road but upon approaching an up-grade the road is illuminated but a relatively short distance ahead owing to the sharp cut-off of the beam slightly above this maximum intensity point. Driving is thereby rendered unsafe at higher speeds in rolling and hilly country. Higher candlepower light sources help somewhat in lighting the way up hills, largely because of the correspondingly higher candlepower above the cut-off. This is a very inefficient method of handling the situation when we consider that the distance within which a car can be brought to a stop varies approximately as the square of the speed, and the candlepower needed to reveal an object ahead varies approximately as the fourth power of the distance. In other words, the candlepower needed varies approximately as the eighth power of the speed. Providing the necessary light above the cut-off by increasing the candlepower of the light source not only adds to cost by increasing the size of battery, generator, wiring, etc., but also adds to the potential glare hazard by making the candlepower in the remainder of the beam needlessly high. A more logical remedy is to direct a moderate amount of light to a height well above the headlamp level, but only as much as is really needed to serve the purpose, thereby deriving maximum benefit from a given increase in light input, considering both glare and road illumination requirements.

The present day upper beam, with its substantially horizontal upper cut-off, affords inadequate illumination of road signs. The provision of more light above the horizontal is needed for this purpose and particularly on the right side of the road where the signs are usually located.

Our improved lighting system overcomes all of the serious defects of the present system at very little additional cost, and with relatively small increase in current consumption and consequently but little added drain on the battery and generator with which cars are now equipped.

In developing this invention a number of factors imposed limitations upon design.

Lack of adjustment in service is responsible for much of our headlighting trouble and it is for this reason essential that the lighting system be so designed as to make it possible to aim the lamps in a simple manner at the usual service stations. This requires that at least one of the arrangements of beams be such that the headlamps may be lined up sidewise by means of a straight edge and vertically by aiming the lamps so that the tops of the beams coincide with a given level on a wall. This is the procedure commonly used on present day equipment.

It is essential for immediate application that the headlamps be capable of projecting beams that comply with all of the State laws on lighting. While certain of the beams projected by our preferred design do not comply with the existing laws in some of the States, the system has been so devised that the illegal beams may be readily modified through disconnection of certain wires so as to make them conform to legal requirements thereby permitting the use of the system with all of its advantages in most of the States and with such of its advantages as may be legal in the remainder.

According to our invention provision is made for the projection of a plurality of beams and the system is characterized by the provision of a lower beam which is asymmetrical in that it is lower on the left side than on the right side. This is the passing beam and while the lowered left side of the beam insures that no rays strike the eyes of the driver of an approaching car, the high right side of the beam gives safe illumination of the path directly ahead and on the right for a considerable distance, making it possible to pass a car at high speeds without causing glare. We have accomplished this by designing each of the headlamps so as to project the uppermost as well as the most intense part of its beam ahead and to one side of the road only. By depressing this part of the beam going to the left side of the road an asymmetrical light pattern is obtained which is higher on the right hand side of the road.

In a more highly developed embodiment of our system we have not been satisfied to provide simply one low beam and one high beam, as is now the common practice, but have also provided an additional beam or beams to better handle the wide range of driving conditions encountered. Thus our complete system may be characterized by a high beam for higher speed country driving on rolling and hilly roads, referred to as the country upper beam, an asymmetrical lower beam for passing while driving in the country, referred to as the country lower beam, a high beam having its relatively sharp cut-off at a lower level than the cut-off of the country upper beam, referred to as the city upper beam, and an asymmetrical lower beam for passing in the city having its cut-off on the right at a lower level than the corresponding cut-off of the country lower beam, referred to as the city lower beam.

Of these, the country upper beam throws a substantial amount of light above the horizontal, and as a consequence would be illegal under the existing laws in a number of States. However, it provides excellent lighting for higher speed driving, illuminates upward slopes in the road for a sufficient distance to insure safety, and provides adequate illumination of road signs and similar objects normally out of range.

The country lower beam is asymmetrical as above described, projecting light down the road at a higher elevation on the right side than on the left, high enough on the right to permit safe passing of other vehicles at much higher speeds than is possible with present equipment.

The country upper and country lower beams just described are distinguished from the city upper and city lower beams chiefly in that some light is projected further down the road and to secure the desired intensity of illumination for high speed driving we have preferably in each case brought an additional filament into action.

The city upper beam is preferably symmetrical, and is roughly the equivalent of the present-day high beam.

The city lower beam is asymmetrical, providing more light down the right hand side of the road and preferably at a higher elevation thereby giving a much better passing light than the present-day low beam. Its cut-off on the right is somewhat lower than the corresponding cut-off of the asymmetrical country lower beam, thereby reducing the possibility of glare, and better adapting the beam for city use.

Figure 3 is a section on line 3—3 of Figure 2.

Figure 4 is a section on line A—A of Figure 2, showing the arrangement of flutes over the corresponding portion of the lens in the case of the right headlamp, while Figure 5 is a section taken on the same line showing the arrangement of flutes in the case of the left headlamp.

Figure 6 is a view, fore-shortened in the direction along the longitudinal axis of the car, showing the city upper beam pattern produced by the headlamps shown in the preceding and succeeding figures, the beam pattern being shown as it would appear on a surface inclined at approximately 45° to the horizontal and at a considerable distance ahead. In actual practice the limiting rays, $x$ and $y$, are parallel to their respective lamp axes.

Figure 7 shows the corresponding asymmetrical country lower beam pattern produced by two filaments.

Figures 3, 4, 5, 6, 7:
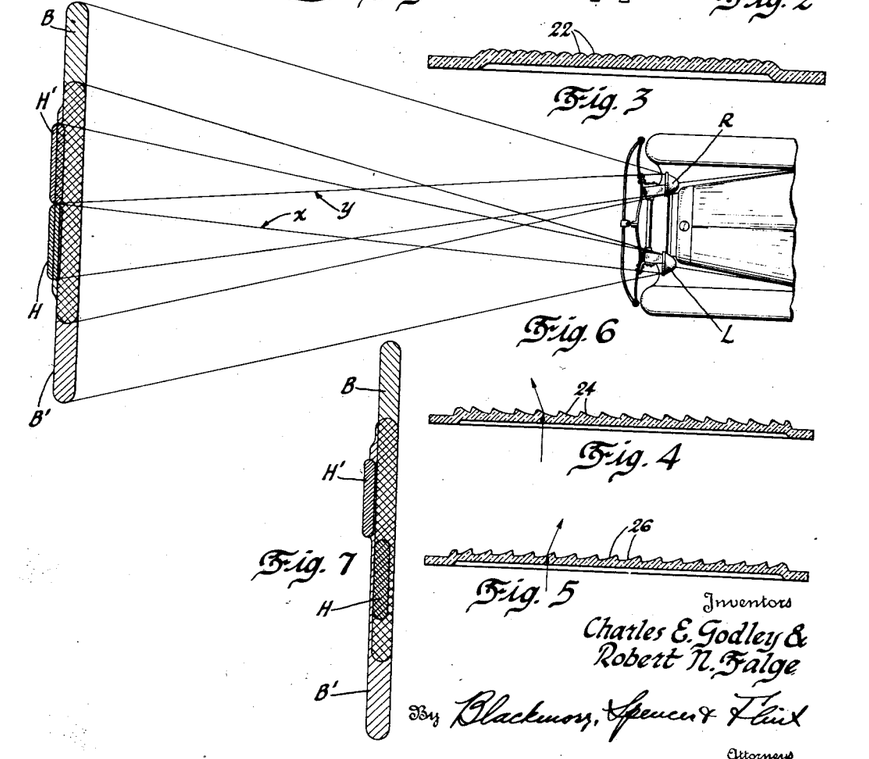

In Figure 6 we have shown a fore-shortened top plan view of an automobile equipped with our improved headlighting system, and have indicated the general form of the beams projected from the lamps as viewed from above. It will be noted that the right headlamp R projects the portion B of its beam substantially symmetrically on both sides of the road, but that it projects the hot spot H of the beam toward the left side of the road only. The left headlamp L projects the portion B' of its beam substantially symmetrically on both sides of the road, but projects its hot spot H' to the right side of the road only. The beams shown in Figure 6 are projected by the intermediate filaments which correspond with the lower filaments in present-day two-filaments headlamps. In Figure 7 we have shown the beam pattern produced by the intermediate filament of the left headlamp and the upper filament of the right headlamp. It will be noted that both the hot spot H and the portion B of the beam from the right headlamp have dropped down somewhat so that the composite beam is no longer symmetrical, but is higher on the right side of the road than on the left. This provides a desirable passing beam, for the driver of an approaching car is relieved of glare that would come from the hot spot H with the beam of Figure 6.

To produce the described patterns, it is, of course, necessary to use a lamp of somewhat different design on the right side of the car than on the left side. The preferred design of headlamps will now be described together with the way the beams are produced, and also the way that the system may be used to produce other beams than those so far referred to.

Figure 21:
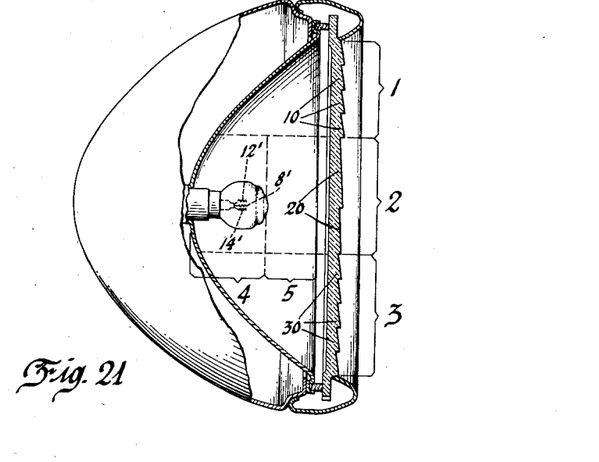
Figure 21 is a vertical section through a modified form of our headlamp.
Figure 22:
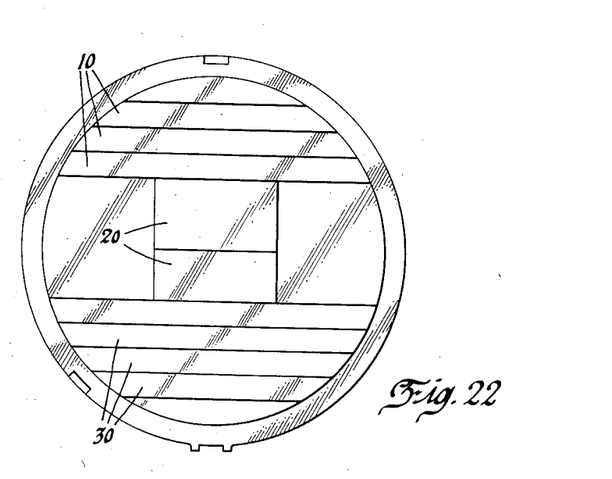
Figure 22 is a front view of the lens used in the lamp shown in Figure 21.

Our headlamps may take several different forms and, in addition, there by be hybrids which are partly of one type and partly of the other. One type is illustrated in Figures 1 to 5, and the other type is illustrated in Figures 21 and 22. A third type employs a plane glass cover instead of a lens and a special reflector of the design shown in Figure 1 but with full flutes and half flutes pressed in it as hereinafter set forth instead of forming the flutes on the lens.

Figures 1, 2:
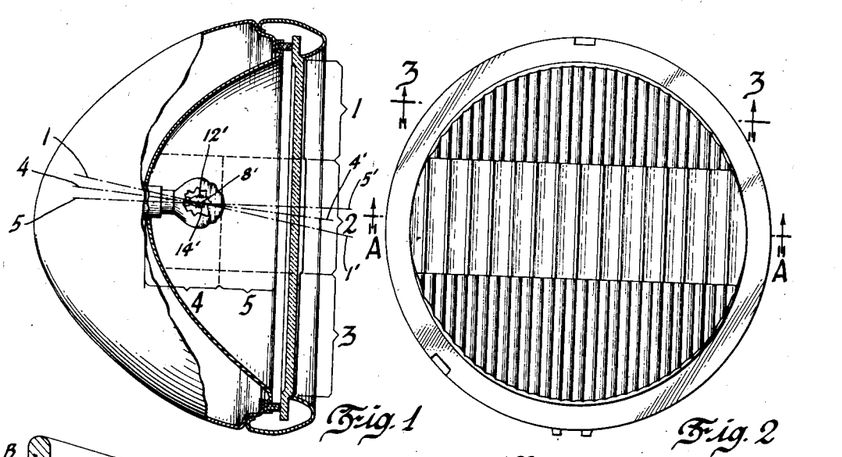
Figure 1 is a vertical section through our improved headlamp embodying a special reflector for rearranging the rays vertically in the beam.
Figure 2 is a front view of the lens employed in the lamp of Figure 1.

In present day headlamp design but two elements are employed to direct light; the reflector and the lens. In Figure 1 we have shown what is termed in the trade a "reflector job" and in Figure 21 we have shown what is termed a "lens job".

The reflectors employed in present day headlights are either true paraboloids or modified paraboloids. While ellipsoids and hyperboloids approach paraboloids as one limit, and near these limits may be used as substitutes for paraboloids, to simplify the discussion it will be restricted to paraboloids, it being understood that the term as used in this specification and claims includes within its scope such obviously equivalent geometric forms.

The following properties of a paraboloid are well known:

If a paraboloidal reflector be cut by a plane normal to the reflector axis and intersecting the axis slightly to the rear of the focal plane, the center portion of the reflector lying to the rear of the focal plane will be found to be very sensitive to vertical changes in the position of the light source. Thus if in a reflector of conventional focal length the source be moved from the focus to a point 1/8" above the focus the light will be thrown down 4° or more. As to the remainder of the reflector which lies wholly forward of the focal plane, the rays reflected from the top and bottom portions will be found to be practically insensitive to changes in the vertical position of the light source. The rays reflected from the side portions will be found to be less sensitive to changes in the vertical position of the light source than rays reflected from the center, movement of the light source to a position 1/8" above focus producing a downward tilt of about 2° in the rays reflected from the sides.

These properties are made use of in the designing of modern two-beam headlamps to produce a downward tilt of the beam by shift in the vertical position of the light source. Thus the top and bottom portions of the reflector may be bent downwardly in an amount sufficient to direct the reflected rays toward the bottom of the high beam, that is, the beam produced with the source at the focus of the reflector. The rays from the intermediate portion of the reflector then form the top of the beam. The center of the intermediate portion which, as previously described, lies to the rear of the focal plane, is very sensitive to changes in filament positioning, and if this light were left at the top of the beam slight variations in filament positioning would cause the rays to rise above the main hot spot produced by the sides of the intermediate zone and dull the cut-off, thereby causing the maximum intensity to be aimed unnecesarily low in States where light above the headlamp level is prohibited. To make the lamps fixed-focus it is necessary to provide the top light for the high beam from the sides of the intermediate portion, which are relatively insensitive. This is accomplished by bending the center of the intermediate portion of the reflector downwardly, say a degree, leaving the side light at the top of the beam.

It is well known among lighting engineers that the same results may be accomplished by bending the rays from the corresponding parts of a plain parabolic reflector downwardly in the varying degrees required, by the employment of prisms on the lens instead of modifying the reflector. Thus relatively heavy prisms may be provided on the top and bottom portions of the lens, and a weaker prism may be provided over the center of the intermediate portion of the lens.

It is also well known that instead of bending downwardly the light from the upper, lower and center portions by bending down the corresponding reflector zones or providing down bending prisms on the lens, the headlamp may be rendered insensitive by axially offsetting the top and bottom of the intermediate portion of the reflector with suitable added modifications as described and claimed in the patents to Clark No. 1,136,507, granted April 20, 1915, and Michel No. 1,594,544, granted August 3, 1926. Obviously this same method may be incorporated in the lens design by the provision of appropriate prisms.

It is also well known to the lighting engineer that hybrid systems may be used. The top of the reflector may be bent down, and the bottom of the lens provided with a down-tilting prism, or vice versa. For a more complete discussion of this problem we refer the reader to the following patents: Falge and Johnson Patent No. 1,571,714, granted February 2, 1926, Falge and Brown Patent No. 1,871,505, filed June 16, 1927, Brown Patent No. 1,822,839, granted September 8, 1931, and Michel Patent No. 1,655,914, granted January 10, 1928.

Our invention involves, as an element of the system, special treatment of reflector, lens, or both, in the manner above described to obtain tilting of the beam. Since bending of portions of the reflector and the provision of prisms on the lens are well known to be equivalents by those skilled in the art, we have chosen to coin language to cover both methods of treatment of the rays. Another consideration that makes it desirable to do this, is the fact that the transition areas between the portions of the reflector are not sharp and definite, but the portions blend into each other, and this gradual blending makes it possible for designers to somewhat arbitrarily separate the zones along horizontal lines, or arcs of different curvature, and, with respect to the apex, in the shape of parallelograms or keystones. All of this is likewise well known.

In order to obtain requisite scope for our invention we have therefore referred to the top and bottom portions of our light directing device (or headlamp) as "top and bottom segments," and to the intermediate portion as the "intermediate segment." We are employing the word "segment" in a sense to include either a reflector alone or a reflector in combination with the portion of a lens in front of it. The necessity for this nomenclature will become apparent in the course of the following description.

Referring now to the alternative forms of headlamps shown in Figures 1 and 21, we have shown these divided into top segments 1, intermediate segments 2, and bottom segments 3. The intermediate segments include the center segments 4, and the side segments 5.

In Figure 1 the rays striking the top and bottom reflector zones, included in segments 1 and 3, are bent downwardly by tilting these zones downwardly as indicated by the tilted axis 1—1'. The rays striking the center reflector zone, included in the center segment 4, are bent downwardly by tilting this zone downwardly as indicated by the tilted axis 4—4'. The axis of the reflector zone included in the side segments 5 remains horizontal as indicated by the axis 5—5'.

The lamp shown in Figure 21 differs from that shown in Figure 1 in that a plane parabolic reflector is used, and tilting of the rays from the top and bottom segments 1 and 3 is accomplished by employing down-bending prisms 10 and 30 over the corresponding reflector zones. The lesser downward tilting of the rays from the center segment 4 is accomplished by employing light down-bending prisms 20 on the center of the lens.

In both the headlamp shown in Figure 1 and that shown in Figure 21, the light is spread laterally in the desired manner by employing symmetrical, vertical, concave or convex flutes over the top and bottom segments of the lens, one form of flute being illustrated at 22 in Figure 3. These flutes may be superimposed on the prisms of the lens shown in Figure 21, or preferably may be arranged on the opposite face of the lens as shown in that figure. The degree of spread of the light from the top and bottom segments may be varied as desired but in general, as previously pointed out, we prefer that the light shall cover the road from side to side as indicated by the patterns B and B' of Figures 6 and 7. The same result could, of course, be accomplished by fluting the reflector in the manner described and claimed in the patent to Sumner Brown No. 1,546,281, granted July 14, 1925.

An essential part of the present invention consists in the provision of half flutes over the intermediate segments of the lamps. In the case of the right head lamp the half flutes 24, as shown in Figure 4, should be arranged to throw light to the center and left side of the road, as indicated at H in Figure 6, and in the case of the left headlamp the half flutes 26, as shown in Figure 5, should be arranged to throw light to the center and right side of the road, as indicated at H' in Figure 6. Here again instead of providing flutes on the lens, the half flutes may be formed on the reflector in accordance with the principles set forth in the Brown Patent 1,546,281, previously referred to. The half flutes employed over the intermediate segments of the lamps may be designed for lateral insensitivity as described in our prior application. The two beams with their hot spots criss-crossed as shown in Figure 6 are then united to form a substantially symmetrical high beam, and by depressing the beam projected from the right headlamp the unsymmetrical passing beam, shown in Figure 7, may be obtained.

We will now describe the construction somewhat more in detail. Light may be obtained from a three-filament bulb of any of the types shown in our prior application. We have chosen to illustrate the form of bulb shown in Figures 16 to 18 of said application. The center filament 8' is on focus while the filaments 12' and 14' are on opposite sides of the focus. The filament 14' is spaced but slightly from the filament 8' so as to obtain an overlapping of beam patterns. The spacing is preferably $\frac{1}{16}''$. If desired a conventional two-filament bulb may be employed having one filament at the focus of the lamp and one filament approximately $\frac{1}{8}''$ above focus.

According to our preferred arrangement when the described three-filament bulb is used, the bulbs will be reversed in position in the two headlamps, that is, in the right headlamp the filament 14' will be bottom-most, while in the left headlamp the filament 12' will be bottom-most.

In Figures 8 to 13 we have shown the beam patterns produced by the individual filaments of the right and left lamps. It will be noted that while the top of the beam produced by the upper filament of the right lamp is about 2° below the top of the beam pattern produced by the intermediate filament, the top of the beam produced by the upper filament of the left lamp is but one degree lower than the top of the beam pattern produced by the intermediate filament. This difference is due to the fact that the upper filament of the right lamp is $\frac{1}{8}''$ above the intermediate filament, while the upper filament of the left lamp is but $\frac{1}{16}''$ above the intermediate filament. The same fact explains the difference in height between the beams produced by the right and left lamps when the lower filaments are energized, the beam from the left lamp being higher because the filament is $\frac{1}{8}''$ below the intermediate filament, while the lower filament of the right lamp is but $\frac{1}{16}''$ below the intermediate filament.

Figure 14:
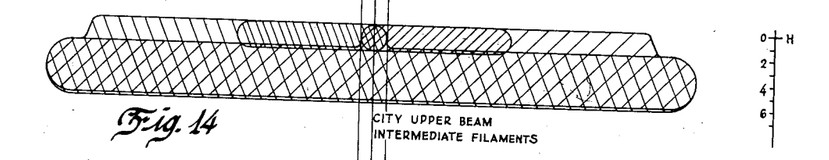
Figure 14 to 18 are illustrations of the composite beam patterns produced with our improved headlamps, each pattern bearing an explanatory legend.

In Figures 14 to 18 we have shown in more detail the composite beam patterns which may be made up by using the two lamps together. Figure 14 shows the pattern produced by combining the patterns of Figures 8 and 9. This pattern is very similar to the upper beam produced by present-day two-beam lamps.

Figure 10:
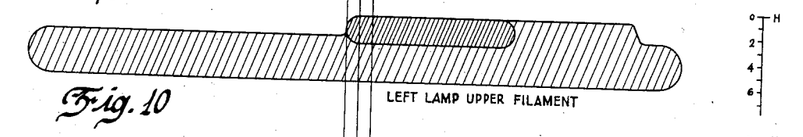
Figure 11:
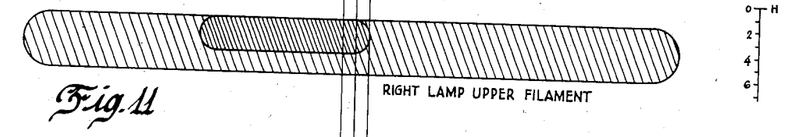
Figure 16:
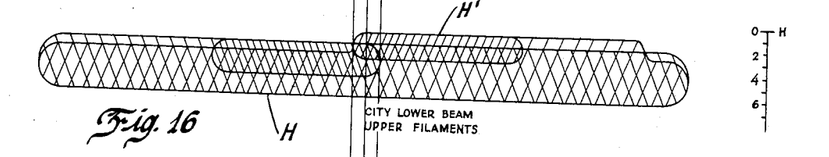

Figure 16 shows the combination of the beam patterns of Figures 10 and 11. It will be noted that this pattern is unsymmetrical in that the beam is lower on the left side than on the right side. This results from the fact that the upper filament of the right lamp is closer to the intermediate filament than is the upper filament of the left lamp.

Figure 8:
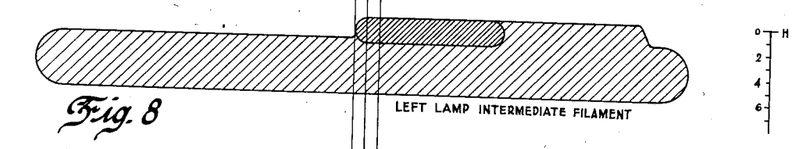
Figures 8 to 13 illustrate beam patterns produced by the individual filaments of our improved headlamps.
Figure 9:
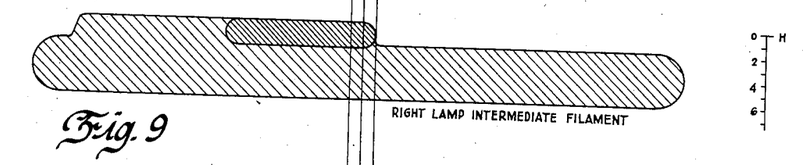
Figure 15:
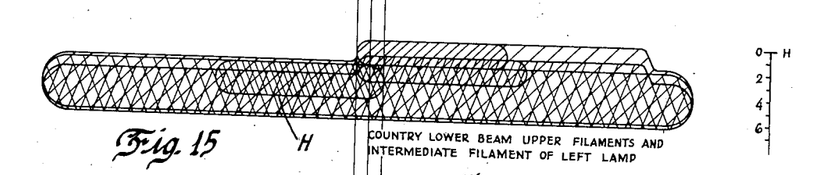

Figure 15 shows the combination of the beam pattern of Figure 16 with the beam pattern of Figure 8. This pattern, too, is asymmetrical in that it is higher and more intense on the right side than on the left side. It will be noted that the two hot spots are provided at the right side of the beam, both extending above the left hand hot spot. This beam will be useful in passing other cars under difficult conditions of travel. The high right hand hot spots not only reach far enough ahead to show up obstacles at a safe distance ahead and on the right in passing; they also minimize the glare from oncoming headlamps by providing relatively high intensity on the road surface ahead and on the right.

Figure 12:
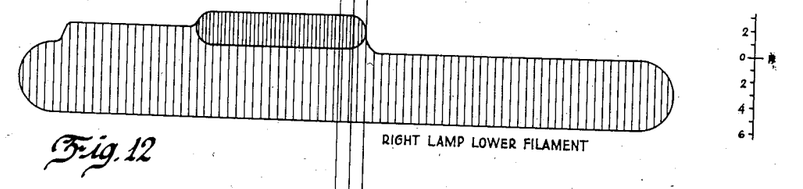
Figure 13:
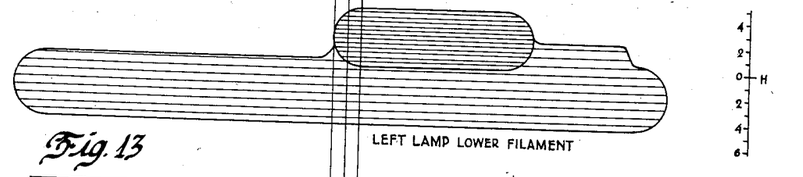
Figure 17:
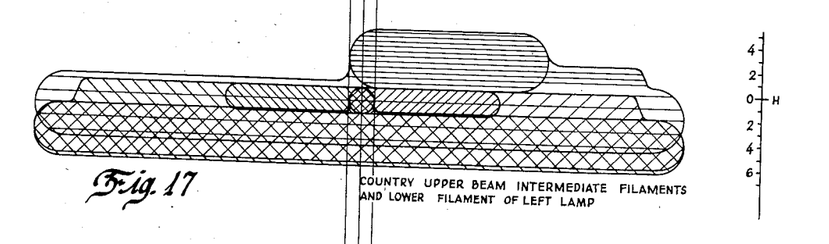

In Figure 17 we have shown the combination of the beam of Figure 14 with the beam of Figure 13. This beam is likewise asymmetrical. It will be noted that it extends three or four degrees above the horizontal but far enough to the right so that it could still be used without glare for passing on straight level roads. An alternate and more desirable arrangement would be that of combining the beam of Figure 14 with the beam of Figure 12, in which case the hot spot in Figure 12, might be extended somewhat farther to the right, thereby covering a more effective angle above the headlamp level.

Figure 18:
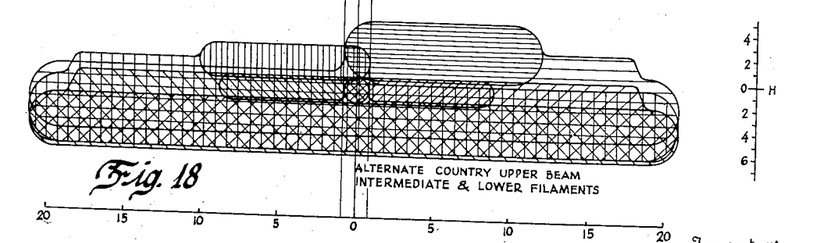

Figure 18 is a combination of the beam pattern of Figure 14 with the beam patterns of Figures 12 and 13. It calls for the energizing of four filaments. While the beam pattern is unsymmetrical, it will be noted that there is a hot spot at the top of the left side of the beam as well as at the top of the right side of the beam. The beam pattern of Figure 18 will provide effective lighting for higher speed driving, particularly over rolling and hilly roads, but should only be used when no cars are approaching.

Figure 19:
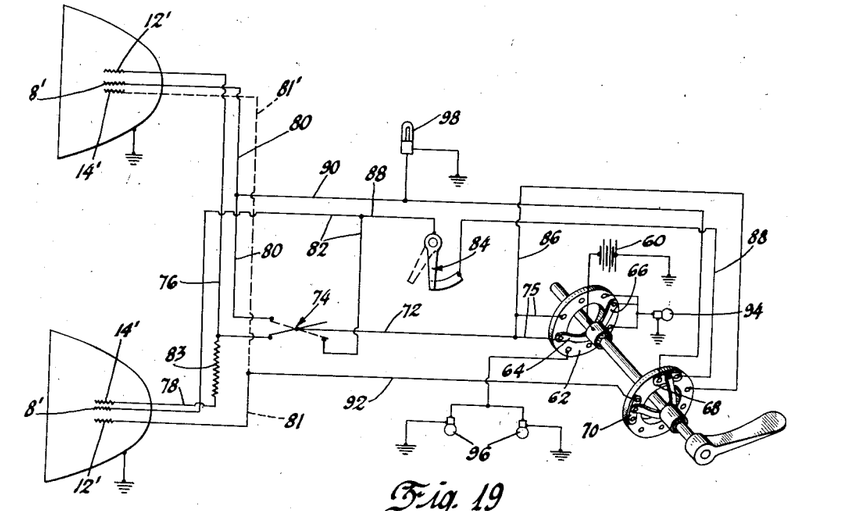
Figures 19 and 20 illustrate a circuit which may be employed to produce the desired beams.
Figure 20:
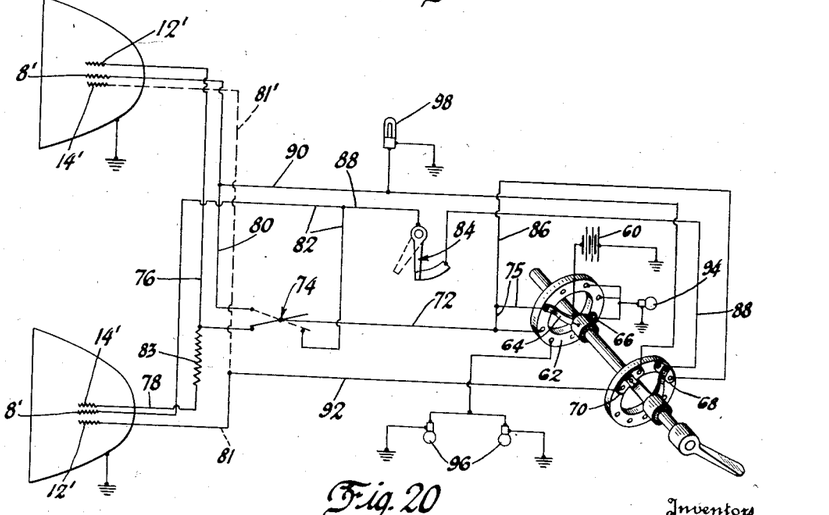

In Figures 19 and 20 we have indicated a switching arrangement which may be used with our improved headlighting system. In Figure 19 current from the battery 60 is supplied to selector switch 62 having two conducting arms 64 and 66 and two insulated arms bearing bridging contacts 68 and 70 respectively. The selector switch is shown in position to permit use of either of the city driving beams. Current from the battery 60 passes through switch arm 64 and lead 72 to foot switch 74. In the position shown the foot switch 74 permits current to flow through leads 76 and 78 to the upper filaments of the two headlamps producing the city lower beam, the pattern of which is shown in Figure 16.

By moving the foot switch 74 to its dotted line position current is supplied through leads 80 and 82 to the intermediate filaments of the two headlamps, producing the city upper beam, the pattern of which is shown in Figure 14.

In Figure 20 we have shown the selector switch 62 in its next position permitting use of either of the country driving beams. In this position use is made of an automatic switch 84 operated by the steering mechanism of the car by any suitable mechanical connection to the steering shaft or other part of the steering gear or by a centrifugal device so adjusted that the switch will be open when the car is making a right turn and closed at all other times. It will be noted that in the position shown current passes in substantially the same manner as before from the battery 60 through the selector switch arm 64, leads 75 and 72, foot switch 74, and leads 76 and 78 to the upper filaments of the headlamps. Current also passes through leads 75 and 86, bridging contact 68, lead 88, automatic switch 84, and leads 88 and 82 to the left filament 8'. This produces the country lower beam, the pattern of which is shown in Figure 15. When the car is rounding a right curve the automatic switch cuts out the left center filament thereby minimizing glare in the eyes of an oncoming driver.

By moving the foot switch 74 to its dotted line position current is supplied through lead 80 to the intermediate filament of the right headlamp, through leads 80 and 90, bridging contact 70, and leads 92 and 81 to the lower filament of the left headlamp; and through lead 82 to the intermediate filament of the left headlamp, producing the country upper beam, the pattern of which is shown in Figure 17. An alternate arrangement which would substitute the beam pattern of Figure 12 for Figure 13 in the country upper beam would be that of energizing the lower filament in the right lamp rather than the left lamp through lead 81' shown in dotted lines, lead 81 in such case being omitted.

To obtain the alternate country upper beam shown in Figure 18 it is but necessary to employ the additional lead shown at 81 in Figures 19 and 20. Obviously, a switch could be interposed in the lead so that the driver would have the option of using either of the country upper beams.

In both positions of the selector switch it will be noted that the tail light 94 is energized, being supplied with current through selector switch arm 66, as shown. In other positions of the selector switch the side lamps 96 are energized in an obvious manner.

In States where the country upper beam is illegal, the lead to the lower filaments of the headlamps may be disconnected or the corresponding contacts may be removed from the selector switch so as to make it impossible to energize these filaments and project light above the horizontal. This will take care of the transition period during which modifications of the headlight laws may be expected to take place.

In the circuits shown in Figures 19 and 20 we have also made use of a pilot lamp 98 which is mounted on the instrument panel of the car in such a position as to be visible to the driver. It is supplied with current by lead 90 which supplies the right intermediate filament causing it to light when that filament is lighted thus indicating to the driver that the city or country upper beam is turned on.

We desire to call attention to the resistance shown at 83 in the lead 78 going to the upper filament 14' of the left headlamp. The purpose of this resistance is to cut down the voltage applied to the said filament when used in the left lamp. It will be remembered that the upper filament 14' of the left headlamp is used with the upper filament of the right headlamp to produce the city lower beam pattern. When so used, the load is substantially less than with three filaments burning so that there is ordinarily a surplus of energy produced by the generator which serves to charge the battery and results in a fairly high voltage at the filaments. On the other hand, this same filament 14' is used below the focus in the right headlamp to produce the light above the headlamp level in the country upper beam. So used, it is burned with two or three other filaments such that the capacity of the generator is ordinarily exceeded and the battery must supply part of the energy. This substantially reduces the applied voltage and tends to reduce the light output from the filament and increase its life where more light and shorter life would be desirable. By inserting the resistance in series with filament 14' in the left headlamp, the filament may be designed to function efficiently when used in the right headlamp without resulting in unnecessarily short life when used in the left headlamp to produce the city lower beam. While it is true that this resistance also serves to reduce the voltage to filament 14' in the left headlamp when burned together with filaments 8 and 8' to produce the country lower beam the resultant decrease in light output is not serious since, even so, the amount of light available for passing is ample for the purpose.

In the foregoing figures we have shown what we term a four-beam circuit, there being an upper and lower beam for city use and a different upper and lower beam for country use. Other combinations employing four beams may be used and the switching devices may be modified both in construction and in arrangement. If desired, the switching arrangement may be modified to provide more than four beams or less than four.

Obviously, we may employ any other of the switching arrangements described in our prior application.

If desired, of course, the half flutes over the intermediate segments of the lamp might be transposed so that each headlamp directed the corresponding portion of its light to its own side of the road. We have, however, found this arrangement to be less satisfactory for passing purposes for the reason that the left side of the hot spot which is directed to the right side of the road must be aimed substantially straight ahead in order not to be directed into the eyes of an approaching driver at a distance of several hundred feet ahead. Interchanging the headlamps serves to move to the right by an amount equal to the distance between headlamps the portion of the illuminated area covered by the hot spot on the right in the passing beam and seriously interferes with visibility of objects directly ahead. Some sacrifice also is involved in the upper beam performance since the hot spots merge at a much greater distance ahead of the car, a difficulty which may be overcome by extending the hot spot from the left headlamp somewhat to the right of the lamp axis.

It will be understood that many of the terms as used herein are to be taken in a relative sense. Thus where we refer to the horizontal as the reference plane above which rays should not pass to avoid glare, it is to be understood we do not have in mind the strict geometrical definition of the term, but the angle, whatever it may be, that is accepted as the limit of elevation for non-glaring rays. Should our invention find application in other fields, such as aeroplane landing beacons, it is to be understood that "horizontal" is to be construed to mean the reference angle whatever absolute direction it may take.

The terms "right" and "left" are also not to be taken in an absolute sense, so as to preclude the extension of our protection to other applications in which a crossing-over of beams may be desirable.

It is also obvious that where we have referred to the employment of two light sources in a single lamp an equivalent result may be obtained by the use of a single shiftable source.

Instead of using headlamps which are rights and lefts it is possible through proper design with this feature in mind, to use the same headlamp and the same lens, simply turning one lens around with respect to the other, either by rotating it 180° about a vertical axis or 180° about a horizontal axis passing through the center of the lens. Of course, where the lens carries prisms as in the form shown in Figure 21 it would not do to rotate the lens about a horizontal axis, for this would invert the prisms.

We claim:

1. In an automobile the combination of a pair of headlamps adapted to be mounted in the customary position at the front of a vehicle and on either side thereof to light the roadway, each of said lamps including a reflector and a lens, a source of light adjacent the focus of the reflector, said reflector and lens constituting top, bottom and intermediate segments, the rays of light from said top and bottom segments being but slightly affected by change in the vertical adjustment of the light source, while the rays of light from said intermediate segment are shifted sharply in a vertical direction upon change in the vertical adjustment of the source, said top and bottom segments being formed to direct the rays falling upon them beneath the rays from the central segment, the central segment of one of said lamps being provided with a series of substantially vertical asymmetrical flutes, having the high sides thereof extending toward one edge of the segment, said flutes spreading light from the center toward one side of the road, the central segment of the other of said lamps being provided with a series of substantially vertical asymmetrical flutes with the higher sides thereof extending toward the opposite edge of the segment, said flutes spreading light from the center toward the opposite side of the road, a portion of one of the other segments of one of said lamps being provided with substantially vertical symmetrical flutes to spread light across the full width of the road.

2. In an automobile the combination of a pair of headlamps adapted to be mounted in the customary position at the front of a vehicle and on either side thereof to light the roadway, each of said lamps including a reflector and a lens, a source of light adjacent the focus of the reflector, said reflector and lens constituting top, bottom and intermediate segments, the rays of light from said top and bottom segments being but slightly affected by change in the vertical adjustment of the light source, while the rays of light from said intermediate segment are shifted sharply in a vertical direction upon change in the vertical adjustment of the source, said top and bottom segments being formed to direct the rays falling upon them beneath the rays from the central segment, the central segment of one of said lamps being provided with a series of substantially vertical asymmetrical flutes, having the high sides thereof extending toward one edge of the segment, said flutes spreading light from the center toward one side of the road, the central segment of the other of said lamps being provided with a series of substantially vertical asymmetrical flutes with the higher sides thereof extending toward the opposite edge of the segment, said flutes spreading light from the center toward the opposite side of the road, a portion of one of the other segments of one of said lamps being provided with substantially vertical symmetrical flutes to spread light across the full width of the road.

3. In an automobile the combination of a pair of headlamps adapted to be mounted in the customary position at the front of a vehicle and on either side thereof to light the road, each of said lamps including a reflector and a lens, said reflector and lens constituting top, bottom and intermediate segments, the rays of light from said top and bottom segments being but slightly affected by change in the vertical adjustment of the light source, while the rays from said intermediate segment are shifted sharply in a vertical direction upon change in the vertical adjustment of the source, said top and bottom segments being formed to direct the rays falling upon them beneath the rays from the central segment, the central segment of one of said lamps being provided with a series of substantially vertical asymmetrical flutes having the high sides thereof extending toward one edge of the segment, said flutes spreading light from said lamp from the center toward one side of the road, said lamp being provided with a source of light at the focus thereof, the central segment of the other of said lamps being provided with a series of substantially vertical asymmetrical flutes with the higher sides thereof extending toward the opposite edge of the segment, said flutes spreading light from the center toward the opposite side of the road, said lamp being provided with a source of light slightly above the focus thereof, and means for simultaneously energizing said light sources thereby producing a composite beam higher on one side than on the other.

4. In an automobile the combination of a pair of headlamps adapted to be mounted in the customary position at the front of a vehicle and on either side thereof to light the road, each of said lamps including a reflector and a lens, said reflector and lens constituting top, bottom and intermediate segments, the rays of light from said top and bottom segments being but slightly affected by change in the vertical adjustment of the light source, while the rays from said intermediate segment are shifted sharply in a vertical direction upon change in the vertical adjustment of the source, said top and bottom segments being formed to direct the rays falling upon them beneath the rays from the central segment, the central segment of one of said lamps being provided with a series of substantially vertical asymmetrical flutes having the high sides thereof extending toward one edge of the segment, said flutes spreading light from the center toward one side of the road, said lamp being provided with a source of light at the focus thereof, the central segment of the other of said lamps being provided with a series of substantially vertical asymmetrical flutes with the higher sides thereof extending toward the opposite edge of the segment, said flutes spreading light from the center of the road toward the opposite side of the road, said lamp being provided with a source of light slightly above the focus thereof, a portion of one of the other segments of one of said lamps being provided with substantially vertical symmetrical flutes to spread light across the full width of the road, and means for simultaneously energizing said light sources thereby producing a composite beam higher on one side than on the other.

5. In an automobile the combination of a pair of headlamps adapted to be mounted in the customary position at the front of a vehicle and on either side thereof to light the roadway, each of said lamps including a reflector, a lens, and means for producing a source of light adjacent the focus of the reflector or at a point above the focus, said reflector and lens constituting top, bottom and intermediate segments, the rays of light from said top and bottom segments being but slightly affected by shifting the position of the light source, while the rays of light from said intermediate segment are shifted sharply downwardly upon changing from a source at focus to a source above focus, said top and bottom segments being formed to direct the rays falling upon them beneath the top of the beam produced when the source is at the focus, whereby, upon changing to a source above focus an effective lowering of the beam is secured, the central segment of one of said lamps being provided with a series of substantially vertical asymmetrical flutes having the high sides thereof extending toward one edge of the segment, said flutes spreading light from the center toward one side of the road, the central segment of the other of said lamps being provided with a series of substantially vertical asymmetrical flutes with the higher sides thereof extending toward the opposite edge of the segment, said flutes spreading light from the center of the road toward the opposite side of the road.

6. In an automobile the combination of a pair of headlamps adapted to be mounted in the customary position at the front of a vehicle and on either side thereof to light the roadway, each of said lamps including a reflector, a lens, and means for producing a source of light adjacent the focus of the reflector or at a point above the focus, said reflector and lens constituting top, bottom and intermediate segments, the rays of light from said top and bottom segments being but slightly affected by shifting the position of the light source, while the rays of light from said intermediate segment are shifted sharply downwardly upon changing from a source at focus to a source above focus, said top and bottom segments being formed to direct the rays falling upon them beneath the top of the beam produced when the source is at the focus, whereby, upon changing to a source above focus an effective lowering of the beam is secured, the central segment of one of said lamps being provided with a series of substantially vertical asymmetrical flutes having the high sides thereof extending toward one edge of the segment, said flutes spreading light from the center toward one side of the road, the central segment of the other of said lamps being provided with a series of substantially vertical asymmetrical flutes with the higher sides thereof extending toward the opposite edge of the segment, said flutes spreading light from the center of the road toward the opposite side of the road, a portion of one of the other segments of both of said lamps being provided with substantially vertical symmetrical flutes to spread light across the full width of the road.

7. In an automobile the combination of a pair of headlamps adapted to be mounted in the customary position at the front of a vehicle and on either side thereof to light the roadway, each of said lamps including a reflector, a lens, and means for producing a source of light adjacent the focus of the reflector or at a point above the focus, said reflector and lens constituting top, bottom and intermediate segments, the rays of light from said top and bottom segments being but slightly affected by shifting the position of the light source while the rays of light from said intermediate segment are shifted sharply downwardly upon changing from a source at focus to a source above focus, said top and bottom segments being formed to direct the rays falling upon them beneath the top of the beam produced when the source is at the focus, whereby, upon changing to a source above focus an effective lowering of the beam is secured, the central portion of said intermediate segment being formed to direct the rays falling upon them beneath the rays from the side portions, the intermediate segment of one of said lamps being provided with a series of substantially vertical asymmetrical flutes having the high sides thereof extending toward one edge of the segment, said flutes spreading light from the center toward one side of the road, the intermediate segment of the other of said lamps being provided with a series of substantially vertical asymmetrical flutes with the higher sides thereof extending toward the opposite edge of the segment, said flutes spreading light from the center of the road toward the opposite side of the road, the flutes over the center of the intermediate segments being of greater curvature than the flutes over the sides thereof.

8. In an automobile the combination of a pair of headlamps adapted to be mounted in the usual manner at the front of the vehicle on either side thereof, each of said lamps comprising a reflector, a light source at the focus of the reflector, and a lens over the front of the reflector, each of said lenses comprising top, bottom, and central zones, and being provided with down-bending prisms, the prisms overlying the top and bottom zones being of greater angle than the prisms overlying the central zone so that the rays passing through the central zone form the top of the beam, the central zone of one of said lenses being provided with a series of substantially vertical asymmetrical flutes having the high sides thereof extending toward one edge of the lens, said flutes spreading light from the center toward one side of the road, the central zone of the other of said lenses being provided with a series of substantially vertical asymmetrical flutes with the high sides thereof extending toward the opposite edge of the lens, said flutes spreading light from the center of the road toward the opposite side of the road.

9. In an automobile the combination of a pair of headlamps adapted to be mounted in the usual manner at the front of the vehicle on either side thereof, each of said lamps comprising a reflector, means for producing a source of light at the focus of the reflector or at a point above the focus, and a lens over the front of the reflector, each of said lenses comprising top, bottom, and central zones and being provided with down-bending prisms, the prisms overlying the top and bottom zones being of greater angle than the prisms overlying the central zone so that the rays passing through the central zone form the top of the beam, and upon changing from a source at focus to a source above focus the top of the beam is dropped, the central zone of one of said lenses being provided with a series of substantially vertical asymmetrical flutes having the high sides thereof extending toward the same edge of the lens, said flutes spreading light from the center toward one side of the road, the central zone of the other of said lenses being provided with a series of substantially vertical asymmetrical flutes with the high sides thereof extending toward the same edge of the lens, said flutes spreading light from the center of the road toward the opposite side of the road, a portion of one of the other zones of both of said lenses being provided with substantially vertical symmetrical flutes to spread light across the full width of the road.

10. In an automobile the combination of a pair of headlamps adapted to be mounted in the usual manner at the front of the vehicle on either side thereof, each of said lamps comprising a reflector, means for producing a source of light at the focus of the reflector or at a point above the focus, and a lens over the front of the reflector, each of said lenses comprising top, bottom, and central zones and being provided with down-bending prisms, the prisms overlying the top and bottom zones being of greater angle than the prisms overlying the central zone so that the rays passing through the central zone form the top of the beam, and upon changing from a source at focus to a source above focus the top of the beam is dropped, the prisms on the central portion of the central zone being of greater angle than the prisms on the sides of the central zone, the central zone of one of said lenses being provided with a series of substantially vertical asymmetrical flutes having the high sides thereof extending toward the same edge of the lens, said flutes spreading light from the center toward one side of the road, the central zone of the other of said lenses being provided with a series of substantially vertical asymmetrical flutes with the high sides thereof extending toward the same edge of the lens, said flutes spreading light from the center of the road toward the opposite side of the road, portions of said top and bottom zones of both of said lenses being provided with symmetrical flutes spreading the light across the full width of the road.

11. In an automobile the combination of a pair of headlamps adapted to be mounted in the usual manner at the front of the vehicle on either side thereof, each of said lamps comprising a reflector, means for producing a source of light at the focus of the reflector or at a point above the focus, and a lens over the front of the reflector, each of said lenses comprising top, bottom, and central zones and being provided with down-bending prisms, the prisms overlying the top and bottom zones being of greater angle than the prisms overlying the central zone so that the rays passing through the central zone form the top of the beam, and upon changing from a source at focus to a source above focus the top of the beam is dropped, the prisms on the central portion of the central zone being of greater angle than the prisms on the sides of the central zone, the central zone of one of said lenses being provided with a series of substantially vertical asymmetrical flutes having the high sides thereof extending toward the same edge of the lens, said flutes spreading light from the center toward one side of the road, the central zone of the other of said lenses being provided with a series of substantially vertical asymmetrical flutes with the high sides thereof extending toward the same edge of the lens, said flutes spreading light from the center of the road toward the opposite side of the road, the flutes on the central portions of the central zone being of greater curvature than the flutes on the sides of the central zone, portions of said top and bottom zones of both of said lenses being provided with symmetrical flutes spreading the light across the full width of the road.

12. In an automobile the combination of a pair of headlamps adapted to be mounted in the usual manner at the front of the vehicle on either side thereof, each of said lamps comprising a reflector, means for producing a source of light at the focus of the reflector or at a point above the focus, and a lens over the front of the reflector, each of said lenses comprising top, bottom and central zones and being provided with down-bending prisms, the prisms overlying the top and bottom zones being of greater angle than the prisms overlying the central zone so that the rays passing through the central zone form the top of the beam, and, upon changing from a source at focus to a source above focus the top of the beam is dropped, the prisms on the central portion of the central zone being of greater angle than the prisms on the sides of the central zone, the central zone of the left hand lens being provided with a series of substantially vertical asymmetrical flutes having the high sides thereof extending toward the right hand edge of the lens, said flutes spreading light from the center toward the right side of the road, the central zone of the right hand lens being provided with a series of substantially vertical asymmetrical flutes with the high sides thereof extending toward the left hand side of the lens, said flutes spreading light from the center of the road toward the opposite side of the road, a portion of one of the other zones of both of said lenses being provided with substantially vertically symmetrical flutes to spread light across the full width of the road.

ROBERT N. FALGE.
CHARLES E. GODLEY.